Dec. 12, 1967    J. E. BAKER    3,357,850
VIBRATION DAMPING TURBOMACHINERY BLADE
Filed May 9, 1963

INVENTOR.
JOHN E. BAKER
BY John F. Cullen
ATTORNEY

United States Patent Office

3,357,850
Patented Dec. 12, 1967

3,357,850
VIBRATION DAMPING TURBOMACHINERY BLADE
John E. Baker, Loveland, Ohio, assignor to General Electric Company, a corporation of New York
Filed May 9, 1963, Ser. No. 279,271
2 Claims. (Cl. 117—69)

This invention relates to vibration damping means and, more particularly, to the composite construction of a member which, through mechanical interface or semi-viscous damping, minimizes generated vibrations therein without the use of external damping means.

Many members which are subjected to vibrations are utilized in such a manner as to preclude, or at least make undesirable, the use of external damping means. For example, members such as support struts or compressor or turbine blades, which are placed in a fluid flow stream, are aerodynamically shaped so as to provide the least disturbance to the flow stream and yet accomplish the purpose for which they are used, be this merely structural support or power transformation.

With respect to compressors or turbines, the operation of these turbomachines is often limited by the existence of vibratory stresses in their respective blades and, therefore, the elimination of these vibrations is imperative. Most attempts at eliminating vibrations in these members have employed external friction devices such as shrouds, dampers on blades and mated root sections of adjacent blades. Experience has shown that such methods involve difficulty in controlling the magnitude of damping and have added mechanical complexity and aerodynamic penalty to the overall machine design, neither of which is desirable in high speed aerodynamic machinery. The use of external damping means involves close manufacturing tolerances which add to the cost of manufacture. In addition, the mechanical sliding friction relied upon is of such a magnitude that it can effect blade erosion and defeat the results of the accurate manufacturing required.

Accordingly, it is one object of this invention to provide a composite structure which efficiently damps vibrations without the use of external damping members.

Another object of this invention is to provide a composite structure for minimizing or damping vibrations which involves nominal mechanical complexity and no aerodynamic penalty.

A further object of this invention is to provide a composite structure for minimizing or damping vibrations which utilizes either mechanical interface or semi-viscous damping located near the surface of the object in order to maximize the magnitude of damping and facilitate dissipation of the generated heat, thus, increasing the life of the damped member.

Further objects and advantages of this invention will be better understood from the following description referring to the accompanying drawings and the features of novelty which characterize this invention will be pointed out with particularity in the claims annexed to and forming part of this specification.

In the drawings, FIGURE 1 is a perspective view of a compressor rotor having blades incorporating the features of this invention.

In accordance with one embodiment of this invention, a member in which vibrations are generated and which is to be damped is formed as a composite structure comprising a main member, a thin sleeve surrounding at least a portion thereof and an isolating and damping member intermediate the two. The isolating material is applied as a thin coating to the main member and serves the dual purpose of facilitating the formation of the sleeve about the main member without any adherence of the sleeve to the main member and providing a means through which the vibration energy may be dissipated. Relative motion between the main member and the sleeve caused by the generated vibrations results in mechanical interface damping.

In an alternate arrangement, the isolating material is of a visco-elastic nature resulting in the dissipation of vibrational energy through the viscous damping properties of the isolating material.

While the composite structure for damping vibrations may be used in many different applications, it is of particular interest when employed in a structure which is located in a fluid flow stream since one of the main advantages of this structure is the absence of any external members, thus providing an aerodynamically smooth, internally damped structure. The following discussion is directed to a specific illustration of one application of this invention.

Figure 1:
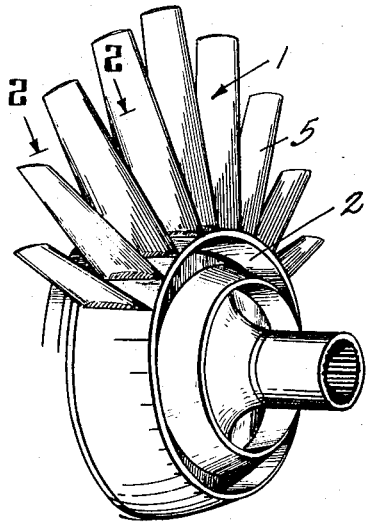
Figure 2:
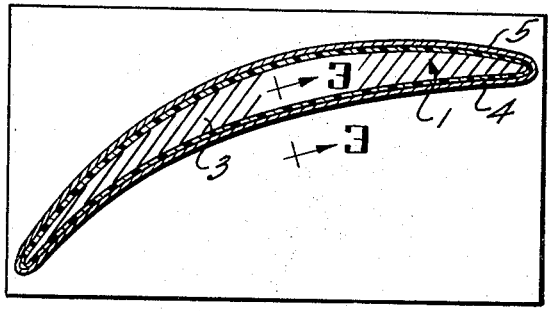
FIGURE 2 is a cross-sectional view taken on the line 2—2 in FIGURE 1.
Figure 3:
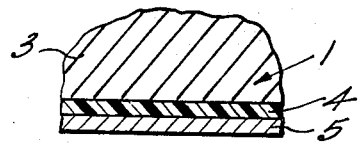
FIGURE 3 is a cross-sectional view taken on the line 3—3 in FIGURE 2.

With reference to the figures, a compressor blade 1 forming part of a compressor rotor 2 (FIGURE 1) is subject to considerable vibrations. The blade 1, constructed in accordance with the invention, is a composite structure (FIGURES 2 and 3) comprising a main member or parent blade 3, an intermediate member 4 formed of a thin coating of isolating material 4 and a sleeve or sheath 5 formed by coating the isolating material 4 with a thin layer of material having sufficient strength to withstand flexing which might be encountered as well as being resistant to various forces and erosive factors to which it might be subjected. The particular material should be chosen in consideration of the particular application in which the composite structure is to be used. However, the important feature is that the sheath 5 must be free to have limited relative motion with respect to the parent blade 3, that is, the sheath must not adhere to the parent blade.

Because the thickness of the sleeve and isolating material is very small in relation to the thickness of the main member, the interface damping will occur very near the outer surface of the composite structure, thus facilitating removal of the heat generated by the vibration damping. Additionally, location of the damping source near the surface of the composite structure maximizes the magnitude of damping since this is the location of maximum strain.

Such a structure will provide damping during flexure or twisting of the composite structure due to the relative motion between the sheath 5 and the parent blade 3. This damping may occur through energy dissipation caused by a working of the intermediate layer or isolating material 4 or the damping may be provided by energy dissipation through dry friction between the sheath 5 and the parent blade 3. The particular type of damping is dependent upon the type of materials used for the two coatings as described below, the choice being determined by the conditions under which the blade is to be used, such as temperature, type of atmosphere, etc.

In the first embodiment, damping is provided by a working of a visco-elastic isolating material 4. The term "visco-elastic" defines materials which are elastic when strained at very low rates of load application (i.e. stress approximately proportional to strain) but which for higher rates of load application have significant magnitudes of viscous properties (i.e. stress proportion to rate of strain). Some examples of visco-elastic materials are: polymethyl methacrylate, polyvinyl chloride, polystyrene, plasticized polyvinyl acetate, polysulfide rubber, butyl rubber compounds, fluoropolymers and ceramic compounds. The visco-elastic material must also have the property of being able to prevent adherence of the sheath 5 to the parent blade 3 such that some degree of relative motion may exist therebetween. Only a slight degree of relative motion is necessary; even microscopic motion would produce the desired results. Application of the isolating material coating 4, which in this embodiment serves as a damping material, may be performed in many ways, such as by spraying, dipping, electrolytic or gaseous deposition, etc., the only requirement being that the coating be maintained relatively thin and uniform.

Upon completion of the application of the damping material 4, the blade is then coated to form an external sheath 5. The coating to form the sheath 5 may be performed in a manner similar to those mentioned above with respect to the coating of the damping material 4. A particularly attractive method for forming a metal sheath is electroplating the sheath on the coated portion of the blade. If the electroplating method is used, the damping material must be an electrically conductive material, or in turn, coated with an electrically conducting material in order to permit the plating of the sheath thereon.

The sheath may be made of various materials, for example metals or some plastics such as glass fiber, polymethyl methacrylate, perfluoroalkyl triazine, diphenylisophthalate or non-foaming urethane rubber compounds. If the electroplating process is employed metals such as nickel, chromium, and tungsten may be used while nickel, nickel-chromium, aluminum oxide, aluminum silicates, and zirconium oxide can be applied by flame-spraying. If a dipping process is employed materials such as aluminum and aluminum silicates may be used.

A second embodiment involves mechanical interfere damping through the use of dry friction rather than a working of the isolating material to produce the desired damping. Relative motion between the parent blade 3 and the sheath 5 results in dry friction between either the parent blade and the isolating material or between the sheath and the isolating material or both. This motion produces damping. As with the semi-viscous damping method, only a slight degree of relative motion is necessary. The isolating material must be capable of being applied in thin layers and may have a high coefficient of friction, if required, for sufficient damping. In any case, the damping obtained is a direct function of the coefficient of friction of the isolating material. The following are examples of materials having these properties: graphite, powdered metals in a bonding agent, ceramic compounds, phosphate coatings, various metallic oxides such as aluminum and beryllium, metal carbides, and paints, especially metallic paints.

Both of the above-discussed embodiments utilize a parent blade which is structurally self-sustaining, that is, the blade does not rely upon the sheath to provide structural support. Therefore, the sheath need not cover or surround the entire blade but need only cover that portion of the blade needed to suppress the vibrations. The composite structure produced by the above method will not have any deleterious effects upon the aerodynamic efficiency of the member to be damped since the shape of the damped member will remain the same, i.e., proper aerodynamic shape. In addition to this, the location of the friction surface adjacent the external surface of the composite structure maximizes the attainable damping and facilitates dissipation of the heat produced by the internal friction. This will increase the life of the blade and prevent dimensional changes caused by thermal expansion. By using the coating or plating method of applying the intermediate member and the sheath, this method is adaptable to twisted blades or other unsymmetrical or odd-shaped members and, therefore, such a shape would not be a limitation on the minimization of vibrations therein. In addition, by locating the friction surface near the outer extremity of the blade, cooling passages which commonly are located in the interior of the blade may continue to be so located therein as differentiated from methods locating a friction surface near the center of the blade which would prevent the placing of cooling passages in the innermost portions of the blade.

While the specific forms and methods of the invention have been shown and described it will be apparent to those skilled in the art that numerous changes, combinations and substitutions of equivalents might be made. It should be again emphasized that while the invention was described with respect to a compressor blade the invention might be utilized on any member which is subject to vibrations. It is therefore contemplated by the claims which conclude the specification to cover all such modifications as fall within the true spirit and scope of this invention.

I claim:
1. A turbomachinery blade comprising;
   a structural blade element,
   a relatively stiff outer sheath element surrounding at least a portion of said structural blade element,
   a relatively thin layer of material separating said elements and being bonded to one of said elements and not the other,
   said thin layer of material frictionally engaging said other element at the interface therebetween,
   the coefficient of friction between said thin layer of material and the element frictionally engaged thereby being at such a level that limited damping movement of the thin layer of material relative to the element frictionally engaged at the interface therebetween is permitted,
   whereby vibration of said structural blade element is damped.

2. A method of making a composite turbomachinery blade comprising the steps of;
   providing a structural blade element,
   coating at least a portion of said blade with a thin intermediate layer of material,
   coating said thin layer of material with an outer sheath element of relatively stiff material,
   bonding said intermediate layer to one of said elements and not the other and frictionally engaging said other element with said intermediate layer such that limited damping movement of the intermediate material relative to the element frictionally engaged at the interface therebetween is permitted,
   whereby vibration of said structural blade element is damped.

References Cited
UNITED STATES PATENTS

| 2,151,280 | 3/1939 | Rouy | 188—1 |
| 2,407,409 | 9/1946 | Chamberlain | 188—1 |
| 2,767,461 | 10/1956 | Lebold et al. | 29—156.8 |
| 2,732,020 | 1/1956 | Scholl | 204—20 X |
| 2,776,253 | 1/1957 | Scholl | 117—71 |
| 2,776,254 | 1/1957 | Bart. | |
| 3,068,556 | 12/1962 | Kramer | 29—156.8 |
| 3,078,969 | 2/1963 | Campbell et al | 188—113 X |
| 3,078,971 | 2/1963 | Wallerstein | 188—113 X |

RALPH S. KENDALL, *Primary Examiner.*

DUANE A. REGER, ALFRED L. LEAVITT,
*Examiners.*